United States Patent [19]

St. John

[11] 3,964,254

[45] June 22, 1976

[54] LOW VELOCITY GAS TURBINE WITH EXHAUST GAS RECYCLING

[76] Inventor: Ward A. St. John, 3684 San Vicente Court, Newbury Park, Calif. 91320

[22] Filed: May 12, 1975

[21] Appl. No.: 576,591

[52] U.S. Cl............................. 60/39.52; 60/39.36; 60/39.74 S
[51] Int. Cl.² ........................ F02C 7/08; F02G 3/00
[58] Field of Search ......... 60/39.52, 39.74 S, 39.36, 60/39.65

[56] References Cited
UNITED STATES PATENTS

| | | | |
|---|---|---|---|
| 2,595,505 | 5/1952 | Bachle | 60/39.65 X |
| 2,599,470 | 6/1952 | Meyer | 60/39.52 |
| 2,669,092 | 2/1954 | Hammaren | 60/39.52 X |
| 3,055,178 | 9/1962 | Phillips | 60/39.69 X |
| 3,546,879 | 12/1970 | Hass | 60/39.16 R |

FOREIGN PATENTS OR APPLICATIONS

| | | | |
|---|---|---|---|
| 627,644 | 8/1949 | United Kingdom | 60/39.65 |

Primary Examiner—Carlton R. Croyle
Assistant Examiner—Thomas I. Ross

[57] ABSTRACT

A low velocity high torque gas turbine, using the Brayton Cycle, and having a high velocity compressor with a separation of the working fluid into two columns, one external for cooling and the other internal for primary fuel injection and combustion. A feature is the recycling of a proportion of the combustion gases that is then combined with the external column of heated cooling air for secondary fuel injection and combustion. The primary and secondary combustion fluids are comingled, the diffused and separated column of cooling air being advantageously employed to supply an excess of oxygen in the working fluid to adequately support combustion. The tubular turbine shaft for recycling combustion gases, and the working fluid distributor that combines the primary and secondary working fluids, and the speed increasor for the compressor, all characterize this invention.

20 Claims, 12 Drawing Figures

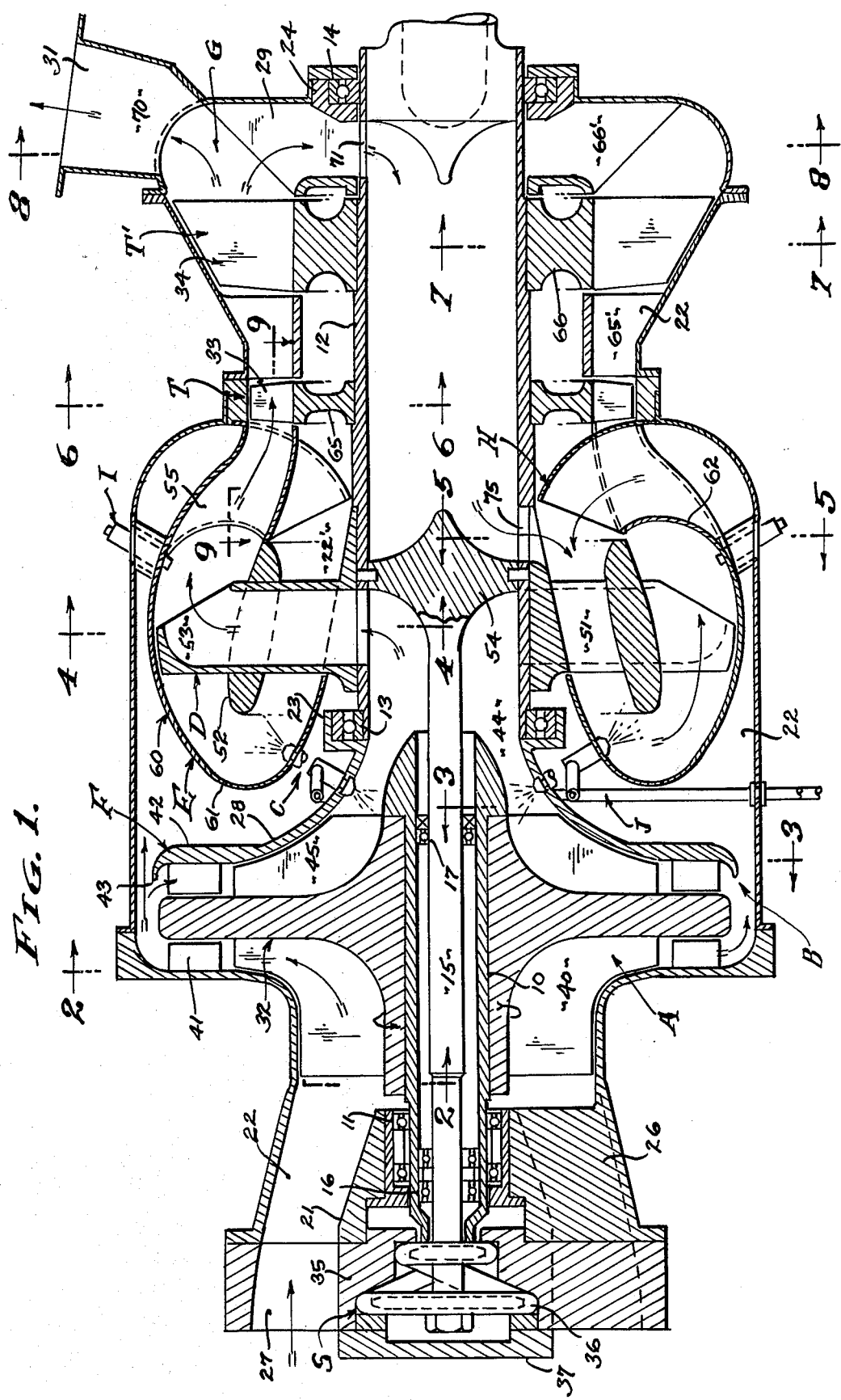

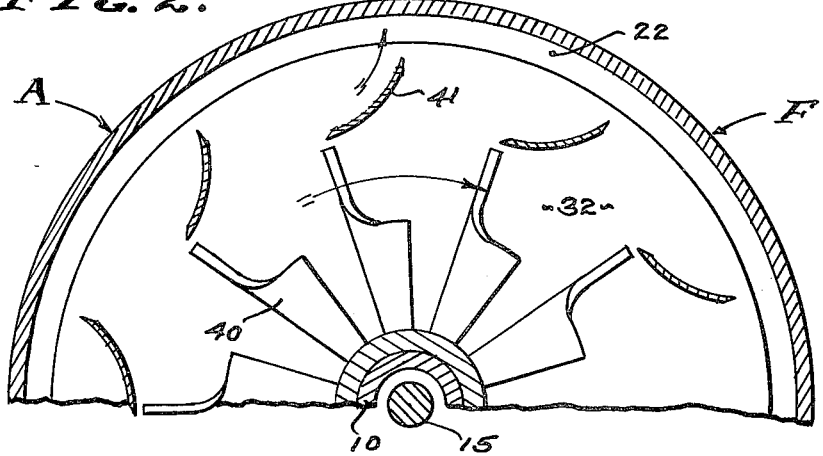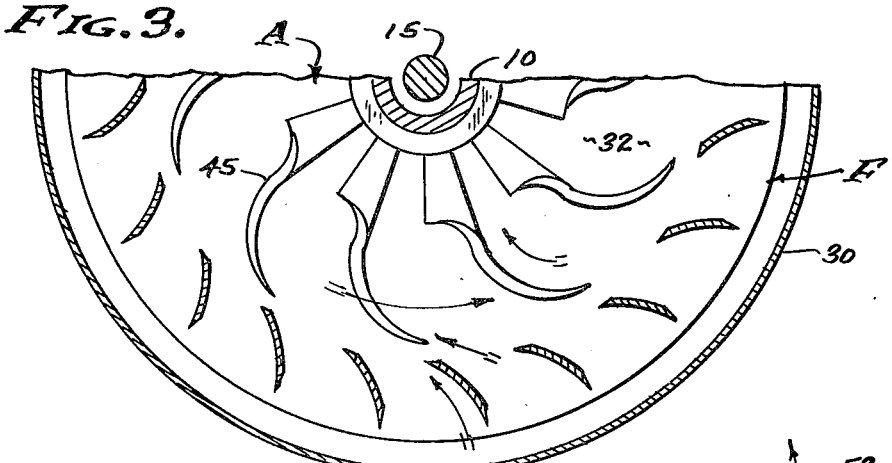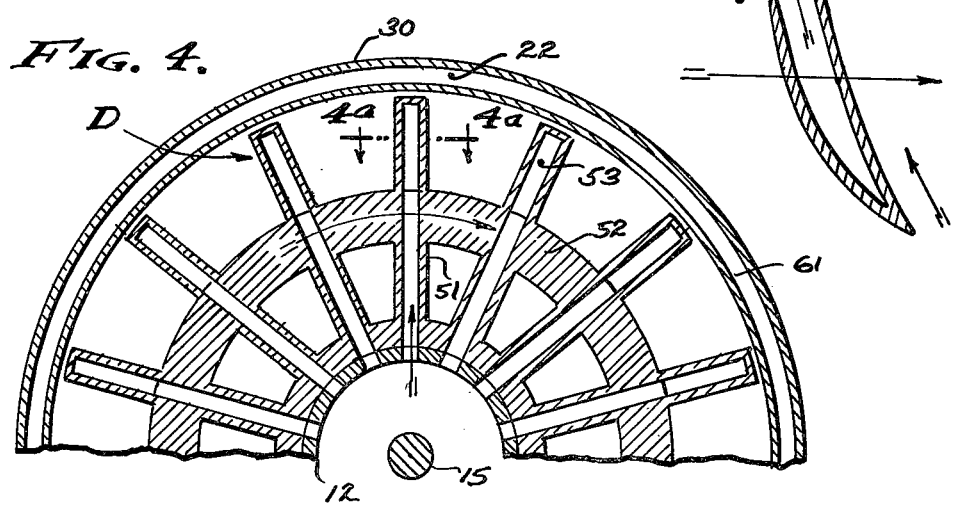

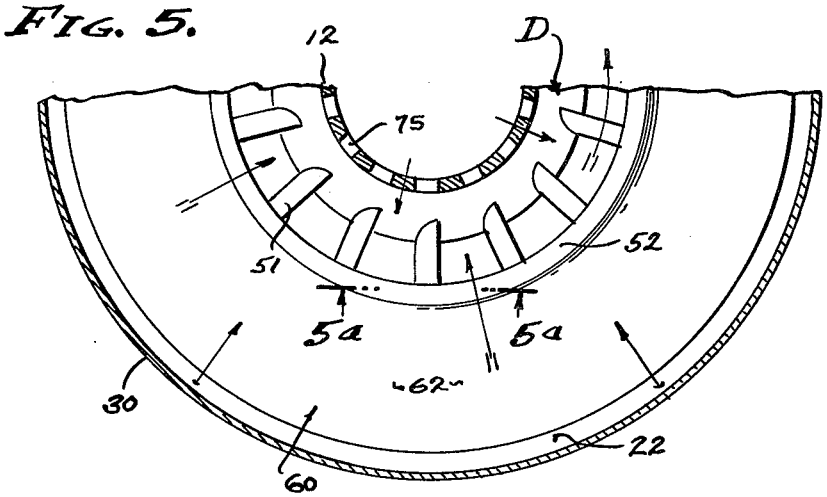
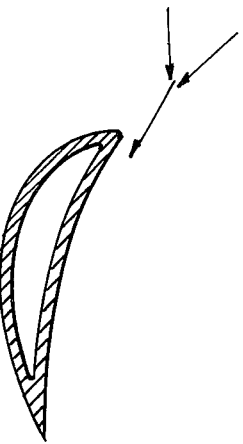
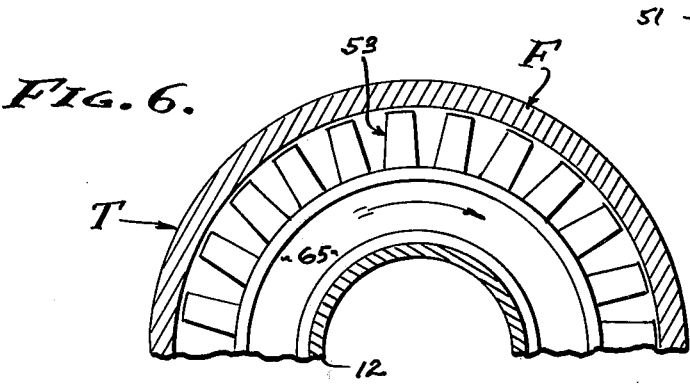
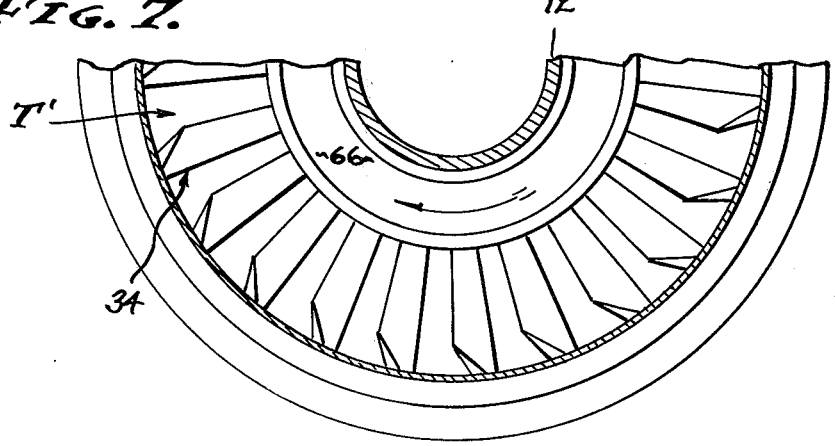

LOW VELOCITY GAS TURBINE WITH EXHAUST GAS RECYCLING

BACKGROUND

This invention relates to rotary engines and namely gas turbines for producing shaft power with minimal thrust (jet) while utilizing an internal combustion cycle, the Brayton Cycle, in which heat is added to a compressed working fluid (air) by the combustion of fuel, and deriving shaft energy from gases expanded through a turbine. High shaft velocities have been the rule with gas turbines, while useable shaft power is at velocities in the lower ranges; and all of which has made prior art gas turbines impractical and/or restricted in use. It is an object, therefore, of this invention to provide a low speed high torque gas turbine, wherein output shaft velocities are reduced while high torque is maintained With the present invention, the turbine operates at lesser velocity than the compressor driven thereby, the shaft output of energy being taken from the slower turbine operating within the high velocity flow of expanding gases.

Prior art turbines have utilized the separation of cooling air, taken from a primary fan and used to maintain sufficiently low operation temperatures. Heretofore, this cooling air has been expended; however it is an object herein to maintain compression of a diffused and separated column of compressor air, firstly used for cooling, and secondly combusted with fuel for the added use of heat energy. With the present invention, the primary stage of the compressor is followed by a diffuser which separates the working fluid into two columns that are sequentially carbureted or fuel injected and proportionately recycled and combined for thorough burning of the fuel used in the engine cycle.

An object of this invention is to proportionately recycle the combusted working fluid with added fuel, by means of which thorough and substantially complete combustion takes place. With the present invention there is an exhaust diffuser and a tubular turbine shaft that cooperate to recycle a determined proportion of the combustion gases, and accordingly it is also an object of this invention to advantageously utilize these heated gases and the aforementioned external column of cooling air by confusing the same as a secondary working fluid into which fuel is injected, and all of which is merged with the primary working fluid for the burning thereof.

Another object of this invention is to provide for the recompression of recycled combustion gases comingled with said external column of cooling air that is heated by a combustion diffuser that separates the cooling air from the combustion gases. With the present invention, the cooling air and proportion of recycled combustion gases are confused and accelerated while being carbureted or fuel injected for subsequent comingling with the primary working fluid, a working fluid distributor being provided for the functions of recompression and comingling of the primary and secondary working fluids. Recompression is achieved by imparting high angular velocity to the confused fluids and by directing them radially outward and then rearward at a pressure and temperature commensurate with that of the primary working fluid.

Turbines which have fans for the external flow of air involve speed reducers driven by a high velocity compressor-turbine. However, it is an object of this invention to provide a low velocity turbine and combine therewith a high velocity compressor with no fan, in which case a speed increasor is interposed between the compressor and turbine, driving the compressor at high velocity. With the present invention the normal rate of compression and the high velocity of gases are maintained, but at lower R.P.M. as compared with prior art turbines With the present invention, multi stage turbine blading commensurate with the required low velocity of rotation is employed to absorb the energy derived from the burning of fuel in the working fluid.

DRAWINGS

The various objects and features of this invention will be fully understood from the following detailed description of the typical preferred form and application thereof, throughout which description reference is made to the accompanying drawings, in which:

FIG. 1 is a longitudinal elevational sectional view of the turbine.

FIGS. 2 and 3 are transverse sectional half views of the compressor and taken as indicated by lines 2—2 and 3—3 in FIG. 1.

FIG. 4 is a transverse sectional half view taken as indicated by line 4—4 in FIG. 1, and FIG. 4a is an enlarged fragmentary view taken as indicated by line 4a—4a in FIG. 4.

FIG. 5 is a half view similar to FIG. 4 and taken as indicated by line 5—5 in FIG. 1, and FIG. 5a is an enlarged fragmentary view taken as indicated by line 5a—5a in FIG. 5.

FIGS. 6 and 7 are transverse sectional half views taken as indicated by lines 6—6 and 7—7 in FIG. 1.

Figure 8:
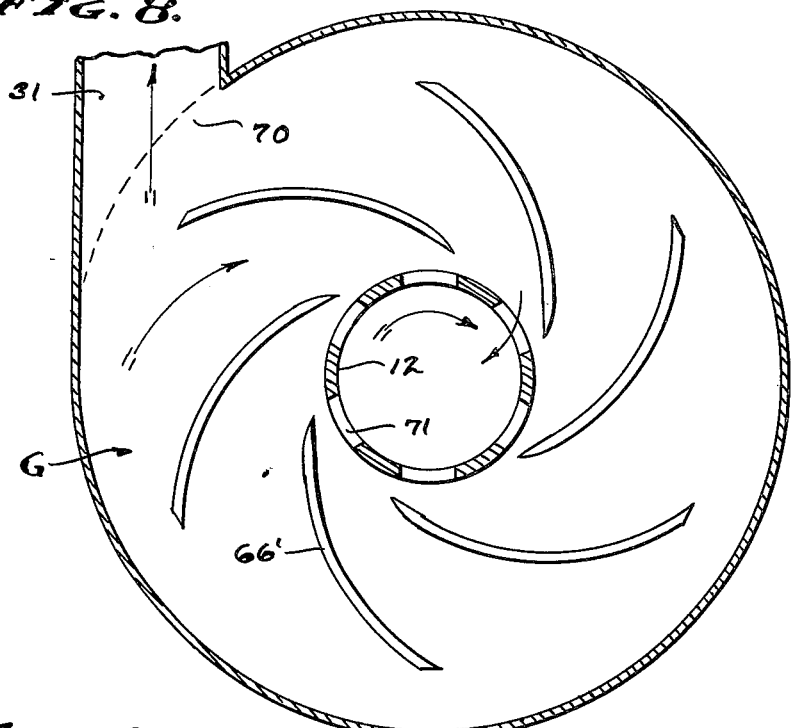

FIG. 8 is a transverse sectional view taken as indicated by line 8—8 in FIG. 1.

Figure 9:
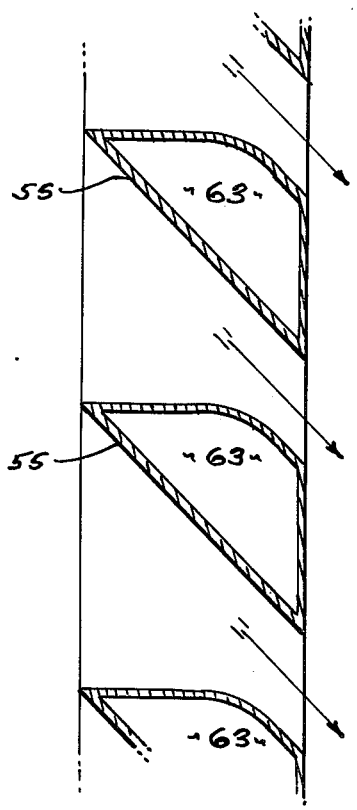
Figure 10:
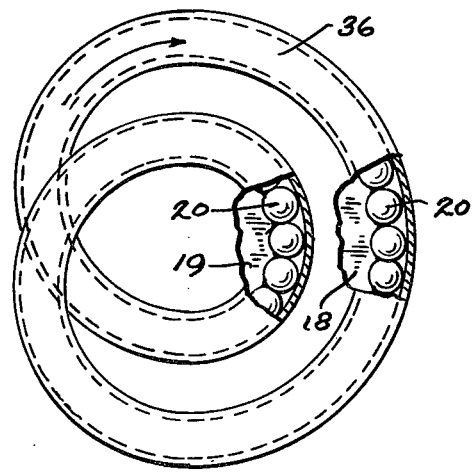

FIG. 9 is a diagrammatic layout of the combustor-diffuser as indicated by line 9—9 in FIG. 1, and FIG. 10 is an enlarged detailed view illustrating the operative elements of the speed increasor that drives the compressor.

PREFERRED EMBODIMENT

Referring now to the drawings, this low velocity gas turbine involves, generally, a frame F, a high speed compressor shaft 10 supported in the frame by bearings 11, a low speed turbine shaft 12 supported in the frame by bearings 13 and 14, a low speed drive shaft 15 extension of shaft 12 and supported concentrically within shaft 10 by bearings 16 and 17, and a speed increasor S comprised of step-up gears 18 and 19 with circulating drive elements 20 operable therebetween.

The frame F is to be constructed as shown with bearing supports 21, 23, and 24 carried by spiders 26, 28, and 29 disposed radially within a cover or shell 30, there being an annulus passage 22 longitudinally coextensive with the frame between an intake opening 27 and an exhaust opening 31 at opposite ends of the engine respectively. The various bearings are anti-friction roller and/or ball bearings, as shown.

The compressor shaft 10 is positioned forwardly in the frame to carry the compressor rotor 32 located adjacent the intake opening 27. The turbine shaft 12 is positioned rearwardly in the frame to carry the multistages of velocity turbine wheels 33 and 34, the latter located adjacent the exhaust opening 31. The drive shaft 15 is positioned by the turbine shaft 12 to drive forwardly therefrom to the speed increasor disposed at the front of the engine within the confines of a wall 35 defining the inner surface of the annulus 22 and which extends rearwardly and inwardly to the minimum hub diameter of the compressor rotor 32.

The speed increasor S can be of varied types, and as shown is comprised of the toothed gears 18 and 19 having the required differential in number of teeth. A channel member 36 embraces a substantial portion of the peripheries of each of the two gears and entrains a series of drive elements 20 in the form of balls or spheres. The drive elements 20 form a drive chain, one driveably engaging the other and to the end that they continuously recirculate within member 36 while the drive gear 18 propells the driven gear 19. The components 18-20 are contained within a lubricant filled housing 37.

The gas turbine cycle, the Brayton Cycle, employed herein is conducted with primary and secondary working fluids while advantageously utilizing internal and external columns of compressor air, the latter column being mixed with a portion of recycled combustion fluid so as to establish said secondary working fluid that is combined with the said primary working fluid and comingled for combustion and subsequent heat absorption through expansion. As shown, the compressor rotor 32 and turbine wheels 33 and 34 operate within the annulus 22 on the shafts 10 and 12 respectively, and cooperate with the elements as will now be described in carrying out the cycle of engine operation, sequentially as follows.

1. This engine cycle is initiated by the first stage of a compressor A comprised of axial-radial blading 40 carried by rotor 32 at its front side and which centrifugally compresses the working fluid inducted through inlet 27. The delivery of compressor A is peripheral with stator blading 41 carried by the frame to direct the flow thereof radially.

2. A compressor diffuser B is provided to receive the working fluid from blading 41, to turn it axially and to separate it into external and internal columns. To these ends this diffuser involves the shell 30 that curves outwardly and rearwardly from the blading 41 and in uniform spaced relation to the periphery of the rotor 32 to continue rearwardly in a cylindrical form, and it involves a divider 42 that restricts the annulus 22 for the proportionate flow of cooling air within the shell 30 and into re-engagement with the compressor A. As shown, the divider 42 presents a curvilinear inner wall that extends radially inward and rearwardly from a cutting edge 43 spaced proportionately from the shell 30 and the rotor 32, for example to determine a ratio of ⅔ external secondary working fluid and ⅓ internal primary working fluid.

3. The rotor 32 carries inwardly curved blading 45 at its back side for second stage compression of the proportionate (⅓) primary working fluid which is confined to the blading by the stationary curvilinear inner wall of the divider to discharge under compression at a central opening 44 and into the rotating turbine shaft 12 of tube form. As shown in FIG. 3 the blading 45 is involute for and to centripitally compress the primary working fluid prior to injection.

4. Primary fuel injection means C is carried by the divider 42, rearward of the blading 45 to induce fossil fuel or the like into the opening 44, preferably a fully enriched stoichiometric ratio thereof. In practice, a pressure pump (not shown) supplies the fuel to nozzles as shown, which comprises the primary injection means.

5. A working fluid distributor D is provided to have a re-compressing function and mixing function, in the comingling of the primary and secondary working fluids discharged thereby into a combustor-diffuser hereinafter described. The distributor D is essentially a turbo-fan, and in accordance with this invention is adapted to establish the axial counter flow of secondary working fluid cooperatively with the comingling thereof with the primary working fluid. As shown, the distributor D is comprised of spokes of tube form through which the primary working fluid passes radially with a centrifugal compressive action, and around which the secondary working fluid passes forwardly for angular acceleration. In practice, the radial extent of the annulus 22 is considerable at and surrounding the tubular turbine shaft 12, and the spokes are divided by a circular duct member 52 into radially inward acceleration blades 51 pitched for said counterflow (forwardly), and radially outward discharge nozzles 53 disposed to project fluid rearwardly for ignition and subsequent expansive combustion. The turbine shaft 12 is ported so as to receive the primary working fluid from opening 44 and directed thereto by a baffle 54 which serves as a coupling between the shafts 12 and 15. The duct member 52 is axially coextensive with the blades 51, confining the said counter flow to discharge forwardly into the combustor-diffuser next to be described.

6. The combustor-diffuser E is provided to effect the re-entry of the secondary working fluid into the primary working fluid, and to this end cooperatively houses the above described distributor D. This combustor-diffuser is a toroidal shell 60 embracing the distributor and manifolded so as to pass all working fluid axially rearward therefrom and to re-circulate secondary working fluid axially forward within the confines of the duct member 52. As shown, the shell 60 is internally open to accept the rotary distributor blades 51, member 52 and nozzle 53; and it is characterized by a foremost cover portion 61 extending from the roots of the blades 51 to the tips of the nozzles 53 and in substantially uniform spaced relation to the duct member 52, thereby forming a curved flow passage to return the counterflow axially rearward. In accordance with this invention, the combustor-diffuser is also characterized by a rearmost cover portion 62 extending from the tips of the nozzels 53 to the shaft 12 at a point spaced from the roots of the blades 51 and in substantially uniform spaced relation to the duct member 52, thereby forming a curved flow passage to establish the aforementioned counter flow of secondary working fluid. Note particularly, however, the manifolding 55, as best illustrated in FIG. 9 which separates the radial inward flow of the secondary working fluid from the axially re-curved flow of the co-mingled working fluids. The manifolding is comprised of a circumferentially spaced series of radially disposed ducts 63 in open communication with the restricted portion of the annulus 22, which thereby directs all cooling air (heated) inwardly for subsequent mixing with recycled exhaust, as will be described. The ducts 63 discharge forwardly within an inner annulus 22' defined between the turbine shaft 12 and duct member 52. 7. Ignitor means I is carried by the combustor-diffuser and exposed to the nozzle 53 in the axial flow portion through the manifolding 55 forward of the duct 63. Thus, it is the co-mingled primary and secondary working fluids that are ignited, the primary working fluid being discharged under compression from the nozzels 53 and intermixed with the secondary working fluid recompressed by the blades 51 and turned to flow rearwardly by the semi-toroidal foremost cover portion 61 of the combustor-diffuser.

8. The ignited working fluid expands rearwardly as it is combusted through at least one turbine stage T and preferably through several stages T and T' as shown. In practice there are two velocity turbine wheels 65 and 66 and each followed by stator blading 65' and 66' for redirecting and nozzeling the working fluid rearwardly, the turbine wheels being driveably carried on the tubular shaft 12. The turbine wheels 65 and 66 are designed to absorb the greatest portion of the heat energy available, and the remaining axial thrust is thereby made minimal.

9. In accordance with this invention, there is an exhaust diffuser G which proportionately recycles the exhaust fluid, and for example which returns ⅓ of the exhaust forwardly through the tubular turbine shaft 12. To this end, the exhaust diffuser is restrictively ported to the atmosphere and into shaft 12 respectively at 70 and 71, thereby to effect the proportionate distribution and recycling of low heat exhaust. The ports at 71 are baffled to redirect the recycled exhaust forwardly within the turbine shaft.

10. A feature of this invention is the mixing of the secondary working fluid with the recycled exhaust, and to this end there is a mixer H which combines these external and internal fluid columns. As shown, the baffle-coupling 54 also serves as an element of the confuser H and which directs the recycled exhaust to flow radially outward through ports 75 through shaft 12 between the roots of blades 51 and comingled with inward and forward discharge of external fluid column. In this way, the said external and internal fluid columns are intermixed with accelerating force and directed centrifugally by the baffle-coupling 54. The mixed columns of fluid are thus acted upon by the accelerative action of blades 51 and discharged into the combustor-diffuser to be centrifugally compressed and comingled with the primary working fluid.

11. The recycled exhaust gases have been substantially depleted of fuel and require enrichment so as to provide the optimum stoichiometric ratio when comingled with the enriched primary working fluid. To this end, secondary fuel injector means J is carried by the divider 42, forward of the blades 51 so as to induce fossil fuel or the like into the combustor-diffuser ahead of the nozzles 53, preferably a lean stoichiometric ratio thereof; the balance between the primary and secondary injectors formulating the optimum air to fuel ratio, thereby determining the proportions in which the atomic elements of combustion properly combine.

From the foregoing, the method of carrying out the Brayton Cycle will be understood as applied to this low velocity output and highly efficient gas flow turbine in which a speed increasor operates the compressor section and in which primary and secondary working fluids are advantageously employed cooperatively with recycled exhaust gases. The details of engine construction are left to those skilled in the art and the service intended will determine the dimensions and relative proportions of the elements and components thereof.

Having described only a typical preferred form and application of my invention, I do not wish to be limited or restricted to the specific details herein set forth, but wish to reserve to myself any modifications or variations that may appear to those skilled in the art:

I claim:

1. A low velocity high torque producing gas turbine including, a compressor having a working fluid inlet and means delivering compressed working fluid, a compressor-diffuser separating the compressed working fluid into external and internal columns thereof, primary fuel injection means charging the internal column with a combustible mixture and ignition means igniting the same in a burner, energy absorbing turbine blading receiving the working fluid through nozzles from the burner, there being an exhaust diffuser receiving working fluid from the turbine blading and with means returning a portion thereof within a drive shaft of said turbine driving said compressor, a mixer comingling the returning portion of exhaust with the said external column, secondary fuel injection means charging the comingled exhaust and external column with a combustible mixture and distributing means comingling the same with the said internal column of working fluid for subsequent ignition and burning therewith.

2. The torque producing gas turbine as set forth in claim 1, wherein the compressor is comprised of blading disposed substantially radially for centrifugal compression of said working fluid.

3. The torque producing gas turbine as set forth in claim 1, wherein an annulus receives compressed working fluid from the compressor, and the compressor-diffuser comprises a circular divider having an edge within said annulus and cutting the fluid into said external and internal columns thereof.

4. The torque producing gas turbine as set forth in claim 1, wherein the compressor has first and second stages and the first stage comprised of blading disposed substantially radially for centrifugal compression of said working fluid into an annulus, wherein the compressor-diffuser comprises a circular divider having an edge within said annulus and cutting the fluid into said external and internal columns thereof, and wherein the second stage of the compressor is comprised of blading disposed involutely for centripetal compression of the internal column of said working fluid.

5. The torque producing gas turbine as set forth in claim 1, wherein the compressor has first and second stages and the first stage comprised of blading disposed substantially radially for centrifugal compression of said working fluid into an annulus, wherein the compressor-diffuser comprises a circular curvilinear divider having an inwardly turned shell with an edge within said annulus and cutting the fluid into said external and internal columns thereof, and wherein the second stage of the compressor is comprised of blading juxtaposed to said inwardly turned shell and disposed involutely for centripetal compression of the internal column of said working fluid.

6. The torque producing gas turbine as set forth in claim 1, wherein the turbine blading expands the working fluid through an axially disposed annulus and the exhaust diffuser being restrictively ported therefrom into the drive shaft to direct said returning portion of exhaust therethrough.

7. The torque producing gas turbine as set forth in claim 1, wherein a combustor-diffuser is manifolded to separate burner working fluid from said external column with axial passages for burning working fluid and radial passages for said external column, the said radial passages being curved inwardly and forwardly to direct said external column axially forward into the returning portion of exhaust, the mixer comprising a radially turned baffle within said shaft and ports therethrough, and the said ports being disposed to direct said returning portion of exhaust into the inwardly and forwardly directed external column.

8. The torque producing gas turbine as set forth in claim 1, wherein a combustor-diffuser is comprised of a toroidal shell embracing the distributing means and has a foremost cover curved outwardly and rearwardly to turn flow axially rearward and has a rearmost cover curved inwardly and forwardly to direct said external column axially forward, the rearmost cover of the combustor-diffuser being manifolded to separate burner working fluid from said external column and with axial passages for burning working fluid.

9. The torque producing gas turbine as set forth in claim 1, wherein a combustor-diffuser is comprised of a toroidal shell embracing the distributing means and has a foremost cover curved outwardly and rearwardly to turn flow axially rearward and has a rearmost cover curved inwardly and forwardly to direct said external column axially forward, the rearmost cover of the combustor-diffuser being manifolded to separate burner working fluid from said external column and with axial passages for burning working fluid, the mixer comprising a radially turned baffle within said shaft and ports therethrough, and the said ports being disposed to direct said returning portion of exhaust into the axially forward directed external column.

10. The torque producing gas turbine as set forth in claim 1, wherein the first mentioned compressor has first and second stages and the first stage comprised of blading disposed substantially radially for centrifugal compression of said working fluid into an annulus, wherein the compressor-diffuser comprises a circular curvilinear divider having an inwardly turned shell with an edge within said annulus and cutting the fluid into said external and internal columns thereof, and wherein the second stage of the compressor is comprised of blading juxtaposed to said inwardly turned shell and disposed involutely for centripetal compression of the internal column of said working fluid, wherein the turbine blading expands the working fluid through an axially disposed annulus and the exhaust diffuser being restrictively ported therefrom into the drive shaft to direct said returning portion of exhaust therethrough, and wherein a combustor-diffuser separates burner working fluid from said external column and is comprised of a toroidal shell embracing the distributing means and has a foremost cover curved outwardly and rearwardly to turn flow axially rearward and has a rearmost cover curved inwardly and forwardly to direct said external column axially forward, the rearmost cover of the combustor-diffuser being manifolded to separate burner working fluid from said external column and with axial passages for burning working fluid, the mixer comprising a radially turned baffle within said shaft and ports therethrough, and the said ports being disposed to direct said returning portion of exhaust into the axially forward directed external column.

11. The torque producing gas turbine as set forth in claim 1, wherein a speed increase means drives the compressor at higher velocity than the turbine blading and a shaft driven thereby.

12. A low velocity high torque producing gas turbine including, a compressor having a working fluid inlet and means delivering compressed working fluid, a compressor-diffuser separating the compressed working fluid into external and internal columns thereof, primary fuel injection means charging the internal column with a combustible mixture, a shaft rotatably supporting a distributing means having radially disposed tubular blading with peripheral and axially disposed discharging nozzles, ignition means igniting said combustible mixture in a burner, energy absorbing turbine blading carried on said shaft and receiving the working fluid through nozzles from the burner, there being an exhaust diffuser receiving working fluid from the turbine blading and with means returning a portion thereof within said shaft driven by said turbine blading and driving said compressor, a mixer comingling the returning portion of exhaust with the said external column, and secondary fuel injection means charging the comingled exhaust and external column with a combustible mixture, and said distributing means comingling the said combustible mixture with the said internal working fluid and combustible mixture thereof for subsequent ignition and burning therewith.

13. The torque producing gas turbine as set forth in claim 12, wherein the shaft driven by said turbine blading is tubular and opens forwardly to receive the internal column of said compressed working fluid, there being a radially turned baffle within the said shaft and ports therethrough directing the fluid into the radially disposed tubular blading.

14. The torque producing gas turbine as set forth in claim 12, wherein the tubular blading of the distributing means is divided by a circular duct member into radially inward acceleration blades acting upon the said returning portion of exhaust and said comingling external columm and into radially outward blades comprising said discharging nozzles, and between which the accelerated and said combustible mixture is passed to comingle with the said internal working fluid and combustible mixture thereof.

15. The torque producing gas turbine as set forth in claim 12, wherein the shaft driven by said turbine blading is tubular and opens forwardly to receive the internal column of said compressed working fluid, there being a radially turned baffle within the said shaft and ports therethrough directing the fluid into the radially disposed tubular blading, and wherein the tubular blading of the distributing means is divided by a circular duct member into radially inward acceleration blades acting upon the said returning portion of exhaust and said external column and into radially outward blades comprising said discharging nozzles, and between which the accelerated and said combustible mixture is passed to comingle with the said internal working fluid and combustible mixture thereof.

16. The torque producing gas turbine as set forth in claim 12, wherein the turbine blading expands the working fluid through an axially disposed annulus and the exhaust diffuser being restrictively ported therefrom into the shaft driven by the turbine blading to direct said returning portion of exhaust therethrough.

17. The torque producing gas turbine as set forth in claim 12, wherein the shaft driven by the turbine blading is tubular and opens forwardly to receive the internal column of said compressed working fluid, there being a radially turned baffle within the said shaft and ports therethrough directing the fluid into the radially disposed tubular blading, and wherein a combustor-diffuser is manifolded to separate burner working fluid from said external column with axial passages for burning working fluid and radial passages for said external column, the said radial passages being curved inwardly and forwardly to direct said external column axially forward into the returning portion of exhaust, the mixer comprising a radially turned baffle within said shaft driven by the turbine blading and ports therethrough, and the said ports being disposed to direct said returning portion of exhaust into the axially forward directed external column.

18. The torque producing gas turbine as set forth in claim 12, wherein the shaft driven by the turbine blading is tubular and opens forwardly to receive the internal column of said compressed working fluid, there being a radially turned baffle within the said shaft and ports therethrough directing the fluid into the radially disposed tubular blading, and wherein a combustor-diffuser separates burner working fluid from said external column and is comprised of a toroidal shell embracing the distributing means and has a foremost cover curved outwardly and rearwardly to turn flow axially rearward and has a rearmost cover curved inwardly and forwardly to direct said external column axially forward, the rearmost cover of the combustor-diffuser being manifolded to separate burner working fluid from said external column and with axial passages for burning working fluid.

19. The torque producing gas turbine as set forth in claim 12, wherein the tubular blading of the distributing means is divided by a circular duct member into radially inward acceleration blades acting upon the said returning portion of exhaust and said external column and into radially outward blades comprising said discharging nozzles, and between which the accelerated and last mentioned combustible mixture is passed to comingle with the internal working fluid as a combustible mixture thereof, and wherein a combustor-diffuser separates burner working fluid from said external column and is comprised of a toroidal shell embracing the distributing means and has a foremost cover curved outwardly and rearwardly to turn flow axially rearward and has a rearmost cover curved inwardly and forwardly to direct said external column axially forward, the rearmost cover of the combustor-diffuser being manifolded to separate burner working fluid from said external column and with axial passages for burning working fluid, the mixer comprising a radially turned baffle within said shaft driven by the turbine blading and ports therethrough, and the said ports being disposed to direct said returning portion of exhaust into the axially forward directed external column.

20. The torque producing gas turbine as set forth in claim 12, wherein a speed increase means drives the compressor at higher velocity than the turbine blading and the shaft driven thereby.

* * * * *